United States Patent
Yamamoto

(10) Patent No.: US 7,259,486 B2
(45) Date of Patent: Aug. 21, 2007

(54) AXIAL FAN

(75) Inventor: Masato Yamamoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/379,579

(22) Filed: Apr. 21, 2006

(65) Prior Publication Data
US 2006/0250039 A1 Nov. 9, 2006

(30) Foreign Application Priority Data
Apr. 21, 2005 (JP) ............................ 2005-123904
Apr. 11, 2006 (JP) ............................ 2006-108158

(51) Int. Cl.
*H02K 7/08* (2006.01)
(52) U.S. Cl. .......................................... 310/90; 310/64
(58) Field of Classification Search .................. 310/90, 310/89, 64
See application file for complete search history.

(56) References Cited

U.S. PATENT DOCUMENTS

| | | | |
|---|---|---|---|
| 4,796,352 A * | 1/1989 | Kawada et al. | 29/596 |
| 4,814,653 A * | 3/1989 | Hasegawa et al. | 310/90 |
| 5,347,187 A * | 9/1994 | Tsuzaki et al. | 310/40 MM |
| 6,411,000 B1 * | 6/2002 | Rew | 310/62 |
| 6,927,509 B2 * | 8/2005 | Cichetti, Sr. | 310/52 |
| 2004/0232786 A1 * | 11/2004 | Fukazawa et al. | 310/89 |
| 2005/0062354 A1 * | 3/2005 | Iles-Klumpner | 310/156.53 |
| 2006/0181168 A1 * | 8/2006 | Hargraves et al. | 310/90 |

FOREIGN PATENT DOCUMENTS

JP     2000-184644 A     6/2000

* cited by examiner

*Primary Examiner*—Dang Le
*Assistant Examiner*—Nguyen Hanh
(74) *Attorney, Agent, or Firm*—James W. Judge

(57) ABSTRACT

In an axial fan, a case (40) accommodating the fan motor stator (50) is anchored into a bearing retainer (10), in which ball bearings (20, 21) as a bearing unit are accommodated, along a bulge part (13) formed on the lower end portion thereof. The case (40) extends heading axially downward, wherein there is no diametrical overlap between the ball bearings (20, 21) and the stator (50). Since only the bulge part (13) of the bearing retainer (10) is fixed to the case (40), heat arising from the stator (50) is thermally conveyed via the case (40) only to the bulge part (13). The fact that the thermal conveyance zone is minimal enables unrestrained curtailment of heat transmitted to the ball bearings (20, 21). As a result the axial fan can be designed for prolonged bearing lifespan.

19 Claims, 2 Drawing Sheets

AXIAL FAN

BACKGROUND OF THE INVENTION

1. Technical Field

The present invention relates to axial fans (given simply to be "motors" hereinafter), in particular to axial-fan motor structures involving 10,000 rpm and faster high-speed rotation.

2. Description of the Related Art

Owing to improvements in the processing speed of integrated circuits employed in server computers, the amount of heat emission from servers themselves has been on the rise in recent years. Thus, securing the airflow volume necessary in order stably to cool server-computer integrated circuits has become a critical requirement demanded of server-cooling fan motors. Consequently, there has been an urgently felt need to improve the revs of fan motors.

Nevertheless, improving the motor revs entails the problem of heat emission from the motor itself increasing. That is, the goal of raising the revs in a motor gives rise to the necessity of passing greater current to the motor's stator, and this turns out to cause the stator to emit heat. In conventional motor structures, because the positional relationship between the motor stator and bearing unit is one in which they are radially opposed across a bearing retainer, heat from the stator gets transmitted to the bearing unit via the bearing retainer. On that account, the bearing unit is subjected, more than is necessary, to the influences of the heat produced by the stator, which has led to the problem of the bearing lifespan consequently being shortened. Moreover, the bearing unit is continually subjected to strong rotational impact due to the increase in motor revs. The rotational impact causes the bearing(s) itself to emit heat, shortening the bearing lifespan all the more.

In that raising the motor revs also makes the motor's magnetic-pole switching more frequent, the vibrations produced when the magnetic poles are switching turn out be a serious problem.

BRIEF SUMMARY OF THE INVENTION

An object of the present invention, brought about taking into consideration the issues discussed above, is in the high-speed-rotation motor art to make available a motor lent both heat-dissipating and vibration-resisting properties.

In an axial fan of the present invention, the impeller revs at 10,000 rpm or faster, wherein a high-level airflow volume is realized. The bearing(s) is disposed unilaterally set off from the fan's magnetic drive unit, and is anchored via a bearing retainer. Therefore, direct contact of the bearing(s) on the stator is non-existent. A further feature of the axial fan is that the bearing unit is configured diametrically smaller than the magnetic drive unit.

In an axial fan of the present invention, inasmuch as the bearing retainer and the stator do not come into direct contact, stator-originated heat directly heating the bearing(s) is not an issue. As a result, bearing lifespan can be assured even under harsh advanced-rotating conditions in which the speed is 10,000 rpm. In implementations in which two or more bearings are retained, since the bearings together can be retained by a single bearing retainer, compared with implementations in which each bearing is retained with a different component, the coaxial precision along the bearing span is improved by at least the assemblage discrepancies that would exist between the different components. The improved precision makes it possible to reduce tilt in the journal that is inserted through the bearings, whereby vibration due to journal tilt can be kept to a minimum.

The fact that the bearing(s) of the present invention are diametrically small by comparison to the magnetic drive unit enables part of the axial flow of air produced by the impeller to strike the magnetic drive unit, which is a heat-emitting component, to effectively cool that area of the motor. A bulge part is formed in the bearing retainer, and axially penetrating through-holes are formed in the bulge part.

By means of the configuration in which through-holes are provided in the bulge part, the stator and the external air communicate, whereby heat from the stator is radiated more readily to the external air. What is more, providing the through-holes increases the surface area of contact between the bearing retainer itself and the external air, whereby heat-dissipating effectiveness can be promoted.

Through-holes are formed axially penetrating the bottom portion of a motor case of the present invention. Forming through-holes in the bottom makes the fanned air flow all the more readily through the interior of the case in which the stator is accommodated, making it possible to promote heat dissipation from the stator.

A circuit board to which coil wires from the stator are connected is fixed to the surface along the underside of the bottom of a case of the present invention.

The present invention configuration in which coil wires have in advance been drawn out through the through-holes in the bottom portion of the case facilitates connection of the coil wires to the circuit board. Moreover, the effectiveness with which heat is dissipated from integrated circuits having been loaded onto the circuit board can be enhanced, because the circuit-carrying board is external to the motor.

A motor of the present invention is an inner-rotor type in which the stator is disposed so as to radially encompass the magnet, and the outer circumferential surface of the magnet and the inner circumferential surface of the stator are opposed across a gap.

Making the rotational mode of a motor of the present invention an inner-rotor type makes it possible to minimize rotational imbalance. Load on the bearing(s) due to rotational imbalance can thereby be reduced, which in particular is optimal in implementations involving high-speed rotation.

An impeller furnished with a plurality of vanes is fixedly retained in the present invention on a portion of the journal upward of the bearing. Thus, rotation of the motor produces a stream of air heading from along the upper end to along the lower end of the motor. This airstream cools the bearing(s) and the stator.

The present invention configuration in which the impeller is attached to the fore-end portion of the motor journal enables a high airflow-volume airstream to be produced by rotating the motor at 10,000 rpm or faster. The airstream induces a flow of air on the bearing(s) and on the surfaces of the bearing retainer and the stator, making it possible to cool the heat produced in the bearing(s) and stator by the rotation of the motor. A high-volume-airflow fan motor that, while being a 10,000-rpm-and-higher-speed rotating motor, spins with long-term stability can thereby be realized.

Therein, the airstream initially passes over the bearing(s) and the surfaces in proximity to the bearing retainer, and next passes over the surfaces in proximity to the stator. Given that the motor is rotated at high speed, it is necessary to supply a large current to the stator coils. The large current is, due to the coil resistance, the causative source of the emission of heat. Furthermore, with brushless motors, flowing to the stator is the high-frequency switching current that goes with running at the 10,000 rpm level, wherein an alternating magnetic field produced in the interior of the stator core by the switching current produces hysteresis loss that is given off as heat. Consequently, in the motor during high-speed rotation, initially the stator heats up. A further consequence, meanwhile, is that during the high-speed rotation the bearing(s) continually undergo impact, which becomes heat produced in the bearing(s). In the present invention, the airstream produced by the fan impeller initially cools the bearing(s) and the bearing retainer, and next cools the stator, which has become the most heated. This enables the bearing(s) to be air-cooled efficaciously, in turn making it possible to prolong the bearing lifespan. Moreover, the airstream enables the stator, having risen to a high temperature, to be air-cooled at the same time, making it possible to prolong the lifespan of the stator coils. These features enable the realization of a high-airflow-volume, long-lifespan fan motor optimal for sever computers and other devices that are operated continuously over the long term without pause.

From the following detailed description in conjunction with the accompanying drawings, the foregoing and other objects, features, aspects and advantages of the present invention will become readily apparent to those skilled in the art.

BRIEF DESCRIPTION OF THE SEVERAL VIEWS OF THE DRAWINGS

FIG. 1 is diagrams illustrating one mode of an embodiment example having to do with the present invention, wherein

DETAILED DESCRIPTION OF THE INVENTION

Figure 1A:
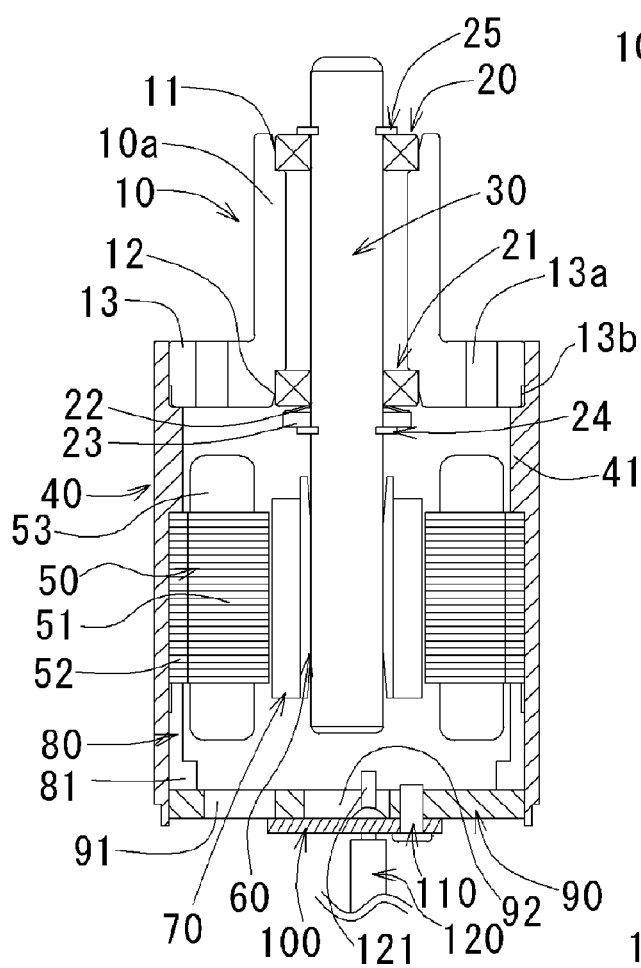
FIG. 1A presents a schematic view in section axially through the motor, FIG. 1B, an upper-side view, and FIG. 1C, an underside view.
Figure 1B:
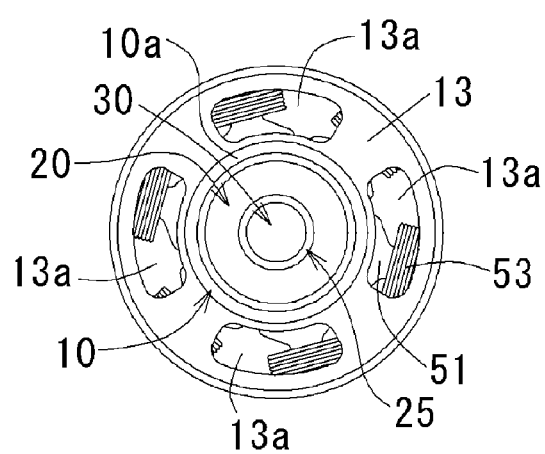
Figure 1C:
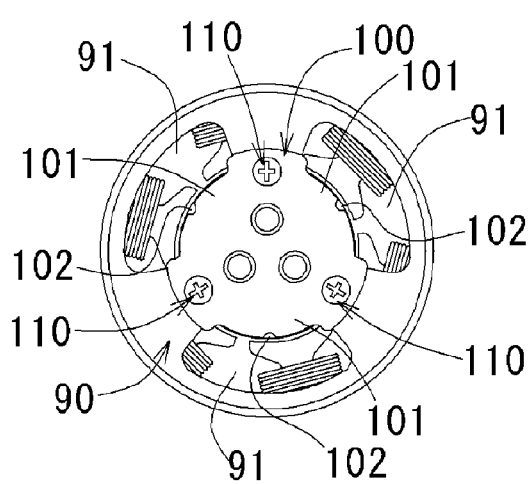

FIGS. 1A to 1C illustrate one embodiment of a brushless motor according to the present invention. Throughout the specification, the up/down directions are defined using the up/down orientations along the shaft axis in FIG. 1A. Accordingly, FIG. 1A presents a schematic sectional view of the motor taken along the shaft axis, FIG. 1B, an upper-side view, and FIG. 1C, an underside view.

A bearing retainer 10 in FIG. 1A is made of die-cast aluminum, and is rendered in a hollow cylindroid form. The bearing retainer 10 has a bearing-retaining cylinder 10a for retaining later-described bearings. The bearing-retaining cylinder 10a has respective recesses 11 and 12 at the upper and lower ends of the bearing-retaining cylinder 10a. These recesses 11 and 12 are die-cast and thereafter machine-processed to enhance the coaxial precision. These recesses 11 and 12 accommodate respective ball bearings 20 and 21, which are press-fit into the recesses. The present structure enables the ball bearings 20 and 21 to be retained with the bearing-retaining cylinder 10a alone, achieving high coaxial precision between the bearings 20 and 21. If instead the ball bearings 20 and 21 were retained with two different components, higher machining precision would be demanded of the components, and moreover high assembly precision would be required, because dimensional deviations in processing the components and discrepancies in assembling them would become cumulative.

A shaft 30, an axial part that is stainless steel shaped into a columnar form, is mounted on the inner peripheries of the ball bearings 20 and 21, wherein the shaft 30 is freely rotating. A corrugated spring, constituting a preloaded spring 22, is attached abutting the bottom side of the lower ball bearing 21. An annular washer 23 is fixed to the shaft 30 so as to retain the preloaded spring 22. The washer 23, made of stainless steel or the like, has an opening on which the shaft 30 abuts. To determine the axial position of the washer 23, a snap ring 24 is also fixed to the shaft 30 so as to abut on the lower surface of the washer 23. Another snap ring 25 is fixed to the shaft 30 so as to abut on the upper side of the inner ring of the ball bearing 20. The preloaded spring 23 and the snap ring 25 impose a load on the inner rings of the ball bearings 20 and 21, while the bearing retainer 10 imposes a load on the outer rings of the ball bearings 20 and 21, whereby the positions of the balls inside the ball bearings are fixed radially and axially.

When inserting a unit comprised of the shaft 30 to which a yoke 60, a magnet 70, and the ball bearing 21 are fixed, through a later-described stator 50 to assemble the motor, the interaction between the stator 50 and the magnet 70 places an axially upward heading force on the assembly. The presence of the preloaded spring 22 on the ball bearing 21 side makes it possible for force that would make the shaft slip axially to be absorbed by the preloaded spring 22. This action minimizes defects originating in excessive force being applied to the ball bearing 21, and thus reduces assembly rejects. To guarantee long-term lifespan along with high-speed rotation, it is desirable that the balls accommodated in the ball bearings 20 and 21 be made of ceramic.

A bulge part 13 is formed below the bearing retainer 10. Although the bulge part 13 may be formed independently from the bearing retainer 10, the bulge part 13 and the bearing retainer 10 should preferably be formed integrally to prevent axial tilt of the bearing-retaining cylinder 10a. The outer circumferential side of the bulge part 13 is press-fit and fixed to the upper end of a case 40. The case 40 is made by molding austenite stainless steel, which has good heat-dissipating properties compared to plastic resins, in a press. The case 40, which is in the form of a hollow round cylinder, and the stator 50 is arranged on the inner circumferential surface of the case 40.

The yoke 60 is fixed to the lower side of, by press-fitting it onto, the shaft 30. The yoke 60 is formed by shaping stainless steel, being a magnetic body, into a hollow cylindrical form by means of a plastic process such as press-working. The magnet 70 is fixed to the outer circumferential surface of the yoke 60. The magnet 70 and the stator 50 are arranged so that the axial center of the magnet 70 coincides with the axis of the stator 50, and are radially opposed across a very slight gap. The magnet 70 and the stator 50 form a magnetic drive unit. As shown in FIG. 1B, the bulge part 13 has a plurality of axially penetrating through-holes 13a arranged at circumferentially equal spacing. The through-holes 13a preferably have circularly arcuate apertures because that enables the opening in the through-holes 13a to be formed large. In the present invention, because the diametrical size of the ball bearings 20 and 21 is smaller than the diametrical size of the magnetic drive unit, sufficient area for the through-hole 13a apertures is assured. This configuration enables more external air to flow onto the stator 50, facilitating heat dissipation from the stator 50.

The description returns again to FIG. 1A. An annular protrusion 41 is formed on the inner circumferential surface of the case 40, for axially positioning the stator 50. This makes it possible to position the stator 50 axially without using jigs or the like when assembling the motor. The upper surface of the protrusion 41 that is on the far side from the stator 50 abuts on the bearing retainer 10. Accordingly, the protrusion 41 also serves to axially position the bearing retainer 10. It should be noted that the protrusion 41 need not have an annular shape. A plurality of axially aligned virgate protrusions may be provided instead, for positioning the stator 50 axially.

Moreover, since contact of the case 40 on the bearing retainer 10 is only in its upper portion where the case 40 is in contact with the bulge part 13 of the bearing retainer 10—that is, since the surface area of contact between the case 40 and the bearing retainer 10 is slight—transmission of heat from the case 40 to the bearing retainer 10 is reduced. Heat generated by the stator 50 is transmitted to the case 40. Nevertheless, the entire outer circumferential surface of the case 40 is in contact with the external air, ensuring good heat dissipation. Moreover, since only a part of the upper portion of the case 40 is in contact with the bearing retainer 10, the area of the surface that transmits heat is small, and accordingly heat transmission to the bearing retainer 10 is as a matter of course slight. Thus, it becomes possible to unrestrictedly minimize the heat that is transmitted to the ball bearings 20 and 21 as retained by the bearing retainer 10, and thereby to prevent shortening of the bearing lifespan due to the impact of heat.

The stator 50 is composed of circumferentially evenly spaced, radially inwardly radiating teeth 51 that are formed by stacking steel plates, a stator core that is formed on the outer peripheral portions of the teeth 51 and that has a core backing 52 circumferentially linking the teeth 51, and coil wires 53 that are wound around the teeth 51. In a high-speed-rotation motor, the necessity of increasing motor efficiency arises in order to minimize heat generation. To increase motor efficiency, a technique is employed in which the coil wires 53 are wound around the teeth 51 as fully as possible. As one example of this technique, the present embodiment adopts a segmented core design in which a separate core is provided for each of the teeth 51. The segmented core design serves to increase the slot-fill ratio of the coil wires 53, thereby improving motor efficiency.

A stator mounting member 80 formed of aluminum or the like is arranged on the inner circumferential surface of a lower portion of the case 40, wherein the stator mounting member 80 abuts on the diametrically outer side of the stator 50, at the lower end surface of the core backing 52. The stator mounting member 80 presses the core backing 52 upward evenly around the entire circumference, so that the stator 50 is clamped axially between the stator mounting member 80 and the protrusion 41 in the case 40. As a result, the stator 50 is put at an even height along its entire circumference, while the center of the stator 50 made uniform along the entire circumference. In other words, the stator mounting member 80 and the protrusion 41 serve to compensate circumferential tilt of the stator 50. Accordingly, inasmuch as circumferential declination of the axial center of the stator 50 and the magnetic center of the magnet 70—which is caused primarily by the stator 50—is not an issue, unevenness in vibration due to the magnetic-pole switching can be prevented.

What is more, clamping the stator 50 axially from both sides improves rigidity of the stator 50, making it possible to prevent the stator 50 from vibrating due to the switching of the magnetic poles. Since the vibration of the stator 50 is transmitted to the ball bearings 20 and 21 via the case 40 and the bearing retainer 10, reducing the vibration means that vibration imparted to the ball bearings 20 and 21 is lowered accordingly. As a result, the lifespan of the ball bearings is prolonged. This is optimal especially for motors such as that of the present invention in which, due to being revved at 10,000 rpm or faster, the magnetic-pole switching is intense, and in which vibration attendant on the pole switching is large.

A plate 90 abuts on the lower end face of the stator mounting member 80. The plate 90 is formed of aluminum or the like in a circular shape and is attached to the lower end face of the case 40 by plastic process such as crimping to thus form the case bottom. A portion of the stator mounting member 80 that abuts on the plate 80 protrudes radially inwardly, forming a protrusion 81 around the entire circumference. In implementations in which the plate 90 is press-fit to the case 40, the case 40 is plastic-deformed by applying a load in an axially upward direction. This protrusion 81 serves to bear the load created in the press-fitting. Providing the protrusion 81 prevents the stator mounting member 80 from deforming, so that the plate 90 is kept at a uniform height level over the entire circumference. Moreover, the axially upward heading force in fitting the plate 90 acts also on the stator 80 via the stator mounting member 90, contributing to putting the stator 50 at an even height along its circumference.

The plate 90 has axially penetrating through-holes 91 provided circumferentially at even intervals. The through-holes 91 enable the lower side of the stator 50 to communicate with the external air. The surface area of contact between the stator 50 and the external air thus increases, promoting heat dissipation. The through-holes 91 should desirably be circularly arcuate apertures, for the same reason as with the through-holes 13 of the bearing retainer 10. The plate 90 also has an opening 92 at its center.

To the lower side of the plate 90, a circuit board 100 is fixed with fastening members 110 such as screws. In a central area of the circuit board 100, three lead wires 120 are fixed with solder or the like. The portion of each of the lead wires 120 that is attached to the circuit board 100 is provided with a conductor part 121. The circuit board 100 has corresponding holes to the conductor parts 121, through which the conductor parts 121 are inserted and soldered to the circuit board 100. The opening 92 of the plate 90 keeps the conductor parts 121 of the lead wires 120 from being in contact with the plate 90.

Referring to FIG. 1C, at the portions of the outer circumference of the circuit board 100 that correspond to the through-holes 91 in the plate 90, the outer circumferential edges of those portions of the circuit board 100 form projections 101 that slightly jut out radially outward of the inner circumferential edges of the through-holes 92. To provide electrical conduction between the lead wires 120 and the stator 50, the coil wires 53 of the stator 50 are drawn out and the drawn-out portions are fixed to the circuit board 100 by soldering or the like. The projections 101 have recesses 102 for circumferentially positioning the drawn-out portions of the coil wires 53. The projections 101 prevent the drawn-out portions of the coil wires 53 from rubbing against the plate 90. Thus, the drawn-out coil wires 53 are prevented from disconnection when being fixed to the circuit board 100. Moreover, since the plate 90 and the coil wires 53 do not come in direct contact with each other, good insulation is assured. What is more, providing recesses 102 makes the circumferential positioning of the drawn-out portions of the coil wires 53 easy, improving production workability.

By supplying current to the coil wires 53 via the lead wires 120 from an external power supply (not shown), the stator 50 generates a magnetic field, and the interaction between the magnetic field and the magnet 70 generates a rotational force. Because the present embodiment adopts an inner rotor design, in which the stator 50 is arranged surrounding the magnet 60, the radius of the rotor can be made small. This means that even if rotational imbalance occurs, the small radius of the rotor keeps the rotational imbalance to minimum. Thus, rotational impact on the ball bearings 20 and 21 is reduced. Moreover, the heat produced at the ball bearings 20 and 21 due to the rotational impact is accordingly reduces, making it possible to prolong the lifespan of the ball bearings 20 and 21. This is optimal for motors such as that of the present invention, which involve high-speed rotation.

In press-fitting the bearing retainer 10 into the case 40, press-fitting the ball bearings 20 and 21 into the bearing retainer 10, press-fitting the shaft 30 into the yoke 60, and press-fitting the stator mounting member 80 into the case, the components that are in contact with each other are in an insertion relationship (clearance fitting) to a certain point along the insertion direction, but beyond that point, they turn to be in a press-fitting relationship (interference fitting). Specifically, positioning is carried out in the insertion section, whereas the fixing is effected in the press-fitting section. For example, for press-fitting the bearing retainer 10 into the case 40, a constriction 13b is formed at a lower part of the bulge part 13 of the bearing retainer 10 so as to have a slightly smaller diameter. With the constriction 13b, the bearing retainer 10 is radially aligned with respect to the case 40, in other words, the axial center of the bearing retainer 10 is aligned with the axial center of the case 40, and subsequently, the outer circumferential surface of the bearing retainer 10 is press-fit to the inner circumferential surface of the case 40. With the constriction 13b of the bearing retainer 10 being inserted in the case 40, the bearing retainer 10 is prevented from tilting, whereby press-fitting can be carried out with the axial center being fixed. It is preferable that the constriction 13b have dimensions such as to prevent the center axis of the bearing retainer 10 from tilting. Specifically, it is desirable that the constriction 13b account for about one-third the portion where the two parts are fit together. As a result, the bearing retainer 10 does not tilt in the radial orientation, whereby the coaxial precision improves between the ball bearings 20 and 21, preventing runout of the shaft 30. Accordingly, adverse effects on the ball bearings 20 and 21 due to the runout of the shaft 30 are reduced, and consequently the lifespan of the bearings is prolonged. What is more, the gap between the magnet 70 and the stator 50 is kept uniform around their circumferences, whereby rotational precision is improved. This serves to reduce vibrations further.

Figure 2:
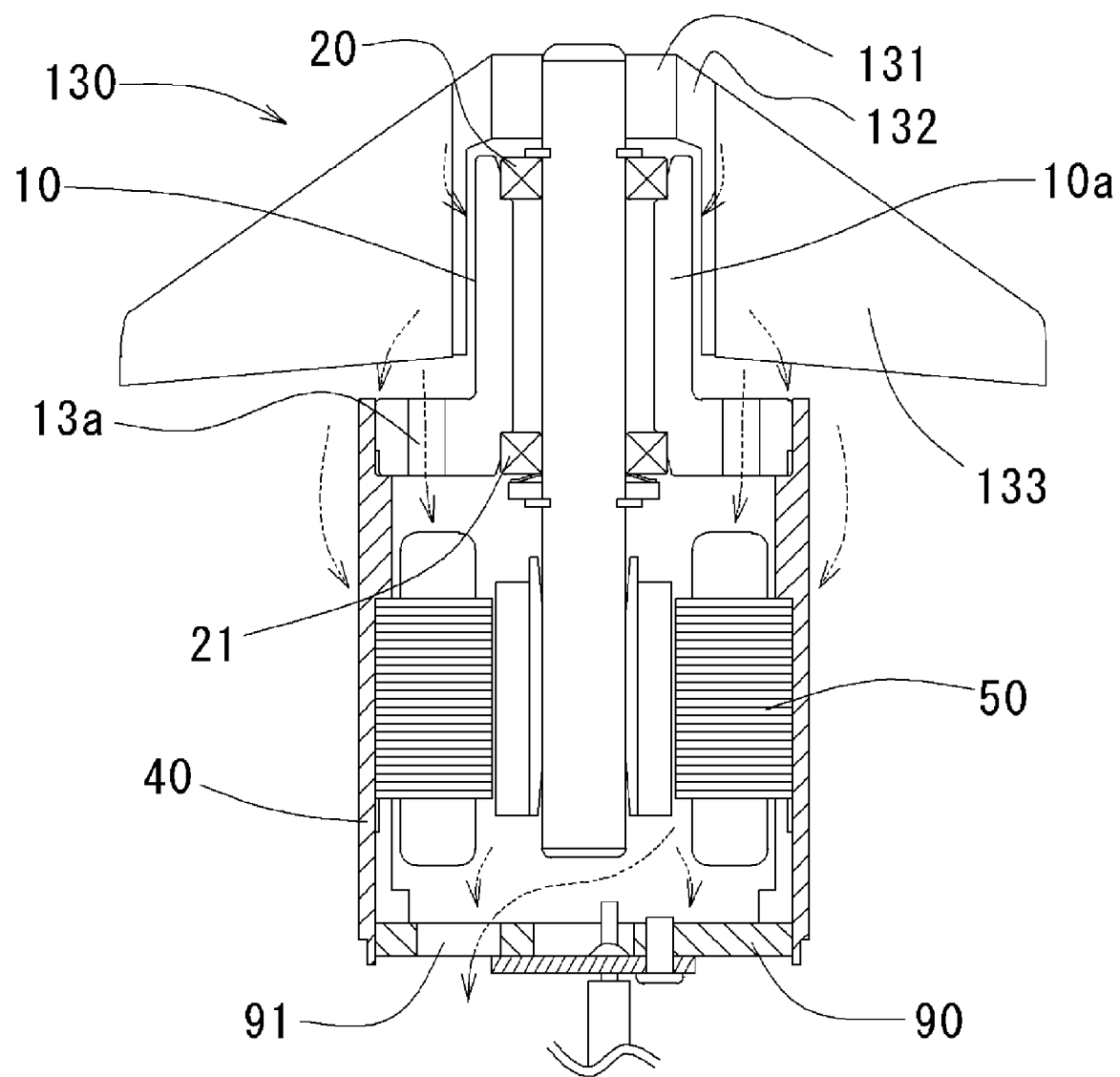
FIG. 2 is a schematic view in section axially through the motor having been fitted with a fan on the upper portion of the shaft in FIG. 1.

Next, referring to FIG. 2, the situation with the fan 130 having been fixed to the upper portion of the shaft 30 will be described. FIG. 2 is a schematic section view along the axis of the configuration in FIG. 1, having been fitted with the fan 130. The dotted-line arrows indicate the paths of the flow of air generated by spinning the fan 130.

Referring to FIG. 2, the fan 130 fixed to the upper portion of the shaft 30 is formed by hemispherical cup portions 132 that, from portions 131 of the fan 130 where it is attached to the shaft 30, encompass part of the upper portion of the bearing retainer 10, and a plurality of outer-peripheral vanes 133 formed integrally with the outer peripheral faces of the cup portions 132. The outer-peripheral vanes 133 parallel the axial orientation of the fan 130 and have the same predetermined slant along its circumference, wherein they function to deliver air from the upper side to the lower side of the fan 130 along its rotational axis.

By the fan 130 rotating, streams of air as indicated by the dotted-line arrows in the figure are formed. These airstreams pass the through-holes 13a in the bearing retainer 10 and collide with the stator 50. In particular, inasmuch as in the present invention the motor is revved at 10,000 rpm or faster, a large current is passed into the stator 50, such that the amount of heat it emits is large. Yet by the airstreams being made to collide directly on the stator 50, the efficiency with which it is cooled is promoted, making it possible to prolong the life of the stator windings. Moreover, the airstreams do not linger in the interior of the case 40, but are passed out to the external atmosphere by way of the through-holes 91 in the plate 90. This enables the air that flows inside the case 40 from the exterior to force out to the motor exterior air, present inside the case 40, which has been heated by the stator 50. This enables the stator 50 cooling efficiency to be further enhanced. What is more, since the airstreams come into contact not only with the interior of the case 40, but also with the outer circumferential surface of the bearing retainer 10, with the abutment between the bearing retainer 10 and the case 40, and with the outer circumferential surface of the case 40 itself, the efficiency with which these areas are cooled can be enhanced as well. The heat transmitted to the ball bearings 20 and 21 is reduced as a result, which enables the fan to be designed for prolonged bearing lifespan. These features make it possible to provide a high-airflow-volume, long-life fan motor optimal for sever computers and other devices that are operated continuously over the long term without pause.

A further feature is that since the outer diameter of the bearing-retaining cylinder 10a portion of the bearing retainer 10 is formed smaller than the case 40, the outer diameter of the cup portions 132 encompassing the bearing-retaining cylinder 10a can be made smaller. Accordingly, for the same outer diameter of the outer-peripheral vanes 133, in this case the outer diameter of the cup portions 132 being made smaller enables a greater airflow volume to be generated.

Although an example embodiment having to do with the present invention have been explained in the foregoing, the present invention is not thereby limited, in that various modifications are possible.

For example, in the present embodiment the case 40 and plate 90 are separate parts, but may be integrally formed. This makes for a further curtailment of parts, contributing to making the motor low-cost. On the other hand, in implementations in which the coil wires 53 from the stator 50 are to lead out to the motor exterior, having the parts be separate is the superior choice in terms of production workability.

A further example of a modification is that in the present embodiment, although the fastening between the case 40 and the plate 90 is by crimping, the fastening method is not thereby limited, and may be welding, gluing, press-fitting, etc. Nevertheless, crimping is the best method in terms of production workability. Further, although the bottom of the case 40 is formed by fastening on the plate 90, the case bottom is not limited to being formed in that way; the bottom may be formed integrally with the case 40.

A still further example of a modification is that in the present embodiment, although the stator 50 is of segmented core design, it is not thereby limited. The stator 50 may be fabricated by winding the coil wires 53 around an annular core, as well as by winding the coil wires 53 around a straight core, and then transforming the straight core into a loop.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. An axial fan, comprising:
   a shaft;
   a magnetic drive unit made up of
      a cylindrical rotor magnet fixed along one end of, and rotational unitarily with, said shaft, and
      a stator having a plurality of magnetic-pole teeth whose radial end portions diametrically oppose the cylindrical surface of said rotor magnet;
   a pair of bearings disposed along the opposite end, with respect to said magnetic drive unit, of said shaft at an axial separation, said pair of bearings for rotatably supporting said shaft and being of outer diameter smaller than said magnetic drive unit;
   a case having an axially extending interior cavity in which said magnetic drive unit is accommodated and into which said stator is anchored;
   a bearing retainer for supporting said pair of bearings, and fixed to said case and being of outer diameter smaller than said case;
   a plate fixed to a portion of said case that is closer to one end of said case than said stator, and opposing another end of said shaft with an axial gap therebetween and having an axially extending through hole;
   a circuit board arranged adjacent to said plate to radially coincide with said shaft at least partly; and
   an impeller fixed along said opposite end of said shaft beyond said pair of bearings, and being diametrically larger than the outer diameter of said magnetic drive unit, said impeller for rotating together with said shaft to generate an axially directed flow of air; wherein
   at least a portion of the through hole in said plate is radially non-coincident with said circuit board.

2. An axial fan as set forth in claim 1, wherein said bearing retainer as a component retaining said pair of bearings is a single, jointless component.

3. An axial fan as set forth in claim 1, wherein:
   said bearing retainer is axially penetrated by at least one hollow hole; and
   the hollow hole opens on and opposes the distal edge along one end of said impeller.

4. An axial fan as set forth in claim 1, wherein:
   a bottom is formed along one end of said case; and
   said bottom forms a sidewall along one end of said cavity.

5. An axial fan as set forth in claim 1, wherein a through-hole for enabling air to flow through an interval between the interior of the cavity in, and the exterior along one axial end of, said case, is formed in either a bottom side along one end of said case, or in said circuit board.

6. An axial fan as set forth in claim 1, wherein:
   a portion of the inner peripheral surface of said case is formed as a stepped part bent heading toward the center of said cavity;
   the end portion of said stator along a distal side thereof abuts on said stepped part; and
   a stator-anchoring member abuts on the end portion of said stator along a proximal side thereof, and is fixed to said case.

7. An axial fan as set forth in claim 1, wherein:
   said bearing retainer is a component formed as a member separate from said case;
   a protrusion projecting radially inward is formed on an inner peripheral surface of said case;
   said stator abuts on an endface said protrusion along one axial end thereof; and
   said bearing retainer in being fixed to said case abuts on an endface of said protrusion along the other axial end thereof.

8. An axial fan as set forth in claim 1, wherein:
   the end portions of said magnetic-pole teeth oppose the outer circumferential surface of said rotor magnet; and
   said rotor magnet is disposed radially inward with respect to said stator.

9. An axial fan as set forth in claim 1, further comprising a preloaded spring disposed to abut on a lower-end one of said pair of ball bearings.

10. An axial fan as set forth in claim 1, wherein:
    the fixing of said bearing retainer to said case is carried out by press-fitting the bearing retainer along the outer circumferential surface thereof into said case along the inner peripheral surface thereof;
    in said bearing retainer outer circumferential surface, in an axially directed portion thereof that, where press-fit into said case, diametrically overlaps the inner peripheral surface of said case, a constriction is formed; and
    in a state in which said bearing retainer has been fixed into said case, the outer circumferential surface of said constriction and the inner peripheral surface of said case are not in contact.

11. An axial fan, comprising:
    a shaft extending along an axis;
    a pair of bearings, disposed at an axial separation, for supporting the shaft in a rotatable manner;
    a bearing retainer axially extending and retaining the bearings rotatably fixed thereto;
    an impeller fixed to one axial end of the shaft with both the bearings arranged on a side of the impeller, and being rotatable together with the shaft;
    a magnetic drive unit disposed on a side of the bearings opposite to the impeller, including a rotor fixed to and rotational unitarily with the shaft and a stator diametrically oppose the rotor magnet with a gap therebetween; and
    a case having an axially extending cavity in which said magnetic drive unit is accommodated and to which said stator is fixed; wherein
       the impeller generates an air flow directed from the one axial end to another axial end of the shaft,
       an outer diameter of the bearing retainer is smaller than that of the case, and
       a through hole is provided at each of axial ends of the case to allow the axial air flow to pass therethrough, the through hole at a bearing-side end of the case being arranged radially outside the bearings.

12. An axial fan as set forth in claim 11, wherein:
    the case surrounds the magnetic drive unit and includes a first portion, a second portion which is thinner than the first portion, and a step between the first and second portions, the step being on inside the case;

a fixing portion is disposed inside the second portion of the case to be in contact therewith; and the fixing portion and the step of the case axially sandwich and fix at least a radially outer portion of the stator therebetween.

13. An axial fan as set forth in claim 11, wherein the bearings and the bearing retainer are arranged away from a bearing-side end of the stator of the magnetic drive unit.

14. An axial fan as set forth in claim 11, wherein an outer diameter of the impeller is larger than those of the bearing retainer and the case.

15. An axial fan as set forth in claim 11, further comprising a circuit board, to which are connected wires for supplying current to the stator, arranged adjacent to one of the axial ends of the case farther from the bearings.

16. An axial fan as set forth in claim 15, wherein the wires are wound around each of magnetic-pole teeth of the stator and drawn to the circuit board via the through hole of the axial end of the case to which the circuit board is adjacent.

17. An axial fan as set forth in claim 11, wherein the bearing retainer includes a first portion extending along the shaft and a second portion closing the bearing-side end of the case and having the through hole.

18. An axial fan as set forth in claim 17, wherein the through hole of the second portion of the bearing retainer radially coincides with at least a portion of wires wound around respective magnetic-pole teeth of the stator.

19. An axial fan as set forth in claim 11, wherein the case is hollow and generally cylindrical, and the through hole at the bearing-side end of the case is circularly arcuate.

* * * * *